US007062698B2

(12) United States Patent
Yang

(10) Patent No.: US 7,062,698 B2
(45) Date of Patent: Jun. 13, 2006

(54) METHOD AND APPARATUS TO CONTROL HEAD INSTABILITY IN A DATA STORAGE SYSTEM

(75) Inventor: Won-choul Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 377 days.

(21) Appl. No.: 10/233,537

(22) Filed: Sep. 4, 2002

(65) Prior Publication Data

US 2003/0065992 A1    Apr. 3, 2003

(30) Foreign Application Priority Data

Sep. 4, 2001    (KR)    ............................... 2001-54154

(51) Int. Cl.
*G11B 20/18*    (2006.01)
(52) U.S. Cl. ...................................... 714/755; 714/758
(58) Field of Classification Search ................ 714/708, 714/755, 758; 360/25
See application file for complete search history.

(56) References Cited

U.S. PATENT DOCUMENTS

| 5,650,887 | A  |   | 7/1997  | Dovek et al.     |       |
|-----------|----|---|---------|------------------|-------|
| 6,018,428 | A  | * | 1/2000  | Okamura          | 360/25|
| 6,137,643 | A  |   | 10/2000 | Flynn            |       |
| 6,147,827 | A  |   | 11/2000 | Southerland et al.|      |
| 6,178,053 | B1 |   | 1/2001  | Narita           |       |
| 6,249,394 | B1 |   | 6/2001  | Li et al.        |       |
| 6,421,193 | B1 | * | 7/2002  | Li               | 360/25|
| 6,490,691 | B1 | * | 12/2002 | Kimura et al.    | 714/8 |
| 6,603,617 | B1 | * | 8/2003  | Cross            | 360/31|
| 2003/0030934 | A1 | * | 2/2003 | Schaff et al.   | 360/66|

FOREIGN PATENT DOCUMENTS

GB    2 343 289    5/2000

* cited by examiner

*Primary Examiner*—Stephen M. Baker
(74) *Attorney, Agent, or Firm*—Staas & Halsey LLP

(57) ABSTRACT

A method and an apparatus to control a data storage system, and more particularly, a method and an apparatus to restore the stability of a head in a data storage system by automatically applying a bias shock current to the head in accordance with the result of a thermal asperity detection (TAD) method, in case that a quality problem occurs in the manufacturing process and/or under severe user conditions. A thermal asperity detection (TAD) routine operates if BER is large or an ECC error occurs in a process of manufacturing a data storage system or in a user field. Thus, it is determined whether the instability of a head causes a quality problem, and if it is determined that the instability of the head causes the quality problem, a bias shock current is automatically applied to the head to restore the stability of the head. It is accurately determined whether the head is unstable if the data quality problem occurs in the process of manufacturing the data storage system or in the user field to automatically restore the stability of the head. As a result, the quality of the data storage system is improved in the manufacturing process thereof and in the market.

26 Claims, 5 Drawing Sheets

METHOD AND APPARATUS TO CONTROL HEAD INSTABILITY IN A DATA STORAGE SYSTEM

CROSS-REFERENCE TO RELATED APPLICATIONS

This application claims the benefit of Korean Application No. 2001-54154, filed Sep. 4, 2001, in the Korean Industrial Property Office, the disclosure of which is incorporated herein by reference.

BACKGROUND OF THE INVENTION

1. Field of the Invention

The present invention relates to a method and an apparatus to control a data storage system, and more particularly, to a method and an apparatus to restore the stability of a head in a data storage system by automatically applying a bias shock current to the head in accordance with a result of a thermal asperity detection (TAD) method, in the case where a quality problem occurs in the manufacturing process and/or under severe user conditions.

2. Description of the Related Art

An existing inductive head uses a method of winding a head core with a coil to transform changes in magnetic flux of a disk into changes in a voltage of a head coil. In the inductive head, the inductance of the head coil has to be lowered for the stability of a data signal if the frequency of the data signal becomes high. This lowers the induction voltage of the head and thus makes the detection of a data signal unstable.

A magneto-resistive head (hereinafter referred to as "MR head") has been developed in response to the problem of the existing inductive head. The MR head uses an MR sensor, which easily senses changes in magnetic flux, to adapt to a data signal having high frequency. Unlike the existing inductive head in which the head coil transforms changes in magnetic flux into changes in the induction voltage, when the MR head reads data, the MR head uses the MR sensor to detect changes in magnetic flux as changes in a resistance value. However, the data storage system uses the existing inductive head structure to improve the writing density per unit area and the signal-to-noise (S/N) ratio in the writing process.

However, the MR head, unlike the existing inductive head, causes an instability of the MR sensor due to an unstable functioning domain of the MR sensor produced by soft electrostatic discharge (ESD) and an inappropriate hard bias operation of both ends of the MR sensor.

A reduction in the width of the MR sensor with an increase in the track per inch (TPI) further increases the instability of the MR head if the capacity of the MR sensor is increased to increase the sensitivity per area of the MR sensor.

In a disk drive, the instability of the MR head causes baseline popping noises, amplitude spikes, and amplitude asymmetry of a signal. As a result, the bit error rate (BER) becomes poor or an error occurs in an error correction code (ECC) inspection when reproducing data. Moreover, the instability of the MR head may occur anytime even in a normal state, and thus increases a defect rate in the manufacturing process and affects the quality of products on the market.

U.S. Pat. No. 5,650,887 and Korean Laid-open Patent No. 1999-72284 relate to a technique to restore the stability of an MR head. U.S. Pat. No. 5,650,887 discloses a technique to apply a reset current to an MR head only if measured servo automatic gain control (AGC) is less than 20%. Korean Laid-open Patent No. 1999-72284 discloses a technique to determine the performance of a head depending on whether a servo signal is detected to apply an inverse reset current to the head.

The instability of the MR head causes a quality problem in processing data in that data error and BER exceeds a reference value. In this case, the instability of a head is not conventionally determined by the baseline popping noise directly caused by the instability of the MR head. Thus, it cannot be accurately determined whether the quality problem occurring in processing data is due to the instability of the MR head in the manufacturing process or a user's condition. As a result, the instability of the head cannot be restored well.

SUMMARY OF THE INVENTION

Accordingly, it is an object of the present invention to provide a method and an apparatus to restore the stability of a head in a data storage system in which a thermal asperity detection (TAD) routine operates to determine baseline popping noises if the BER is bad or an error occurs in the error correction process when processing data in a manufacturing process or in a user field, determine whether the instability of the head causes a quality problem, and automatically apply a bias shock current to the head if it is determined that the instability of the head causes the quality problem.

Additional objects and advantages of the invention will be set forth in part in the description which follows and, in part, will be obvious from the description, or may be learned by practice of the invention.

The foregoing and other objects of the present invention may be achieved by providing a method of controlling the instability of a head in a data storage system by determining the instability of the head, the method comprising: monitoring a bit error rate to determine whether the bit error rate exceeds a reference value; detecting a thermal asperity in a predetermined section of a disk and counting the number of detected values of the thermal asperity if the bit error rate exceeds the reference value; determining whether the counted value of the thermal asperity exceeds an admissible value ; and performing a process of restoring the stability of the head if the counted value of the thermal asperity exceeds the admissible value.

The foregoing and other subjects of the present invention may also be achieved by providing a method of controlling the instability of a head in a data storage system by determining the instability of the head, the method comprising; determining whether a retry routine is to be performed a predetermined number of times due to an error occurring when a reproducing mode is turned on ; detecting a thermal asperity by performing a retry in a target sector in which an error occurs and counting the number of the detected values of the thermal asperity if the retry routine is turned on ; determining whether the counted value of the thermal asperity exceeds an admissible value ; and performing a process of restoring the stability of the head if the counted value of the thermal asperity exceeds the admissible value; otherwise, processing data in a retry process.

The foregoing and other subjects of the present invention may also be achieved by providing an apparatus to control the instability of a head in a data storage system by determining the instability of the head. The apparatus includes a head, a signal processor, a controller, a thermal asperity detector, and a head supply current controller. The head detects a signal written on a disk. The signal processor processes the signal detected by the head as data prior to being written in a reading mode and generates write current corresponding to data to be written in a writing mode. The controller performs a predetermined performance inspection related to data errors using the data processed by the signal processor, generates a thermal asperity detection control signal if the performance inspection reveals data errors that exceed a predetermined limit, and generates a current shock control signal if the counted value of the thermal asperity exceeds an admissible value. The thermal asperity detector counts the number of the thermal asperities due to baseline popping noises detected in a predetermined section and outputs the number of the thermal asperities to the controller if the thermal asperity detection control signal is applied. The head supply current controller applies reset current pulses to the head if the current shock control signal is applied.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
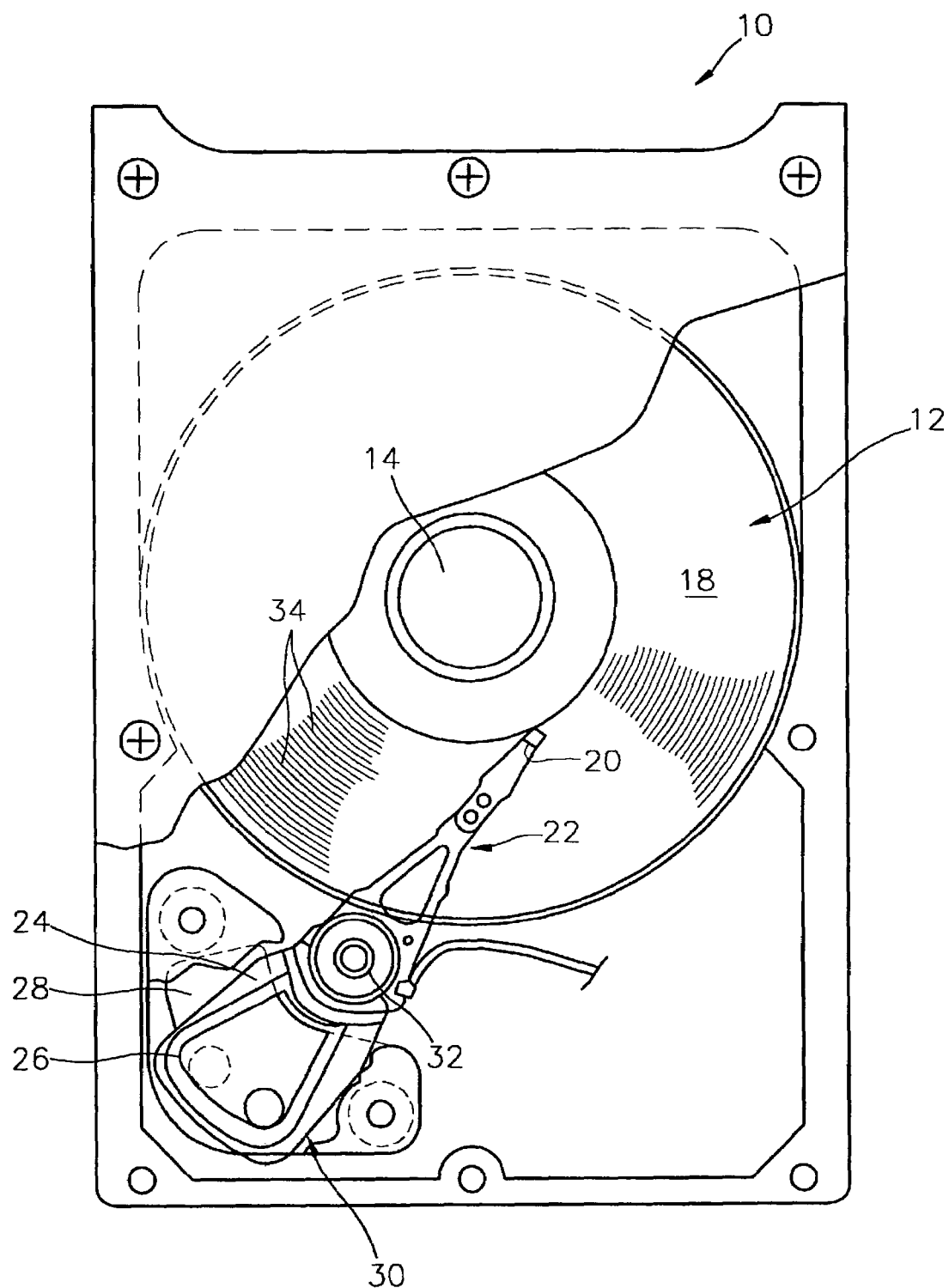
FIG. 1 is a plan view of a hard disk drive according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a plan view of a hard disk drive 10 according to an embodiment of the present invention. The hard disk drive 10 includes at least one magnetic disk 12 which is rotated by a spindle motor 14. The hard disk drive 10 also includes a transducer (not shown) which is located adjacent to a disk surface 18.

The transducer senses and magnetizes a magnetic field of the magnetic disk 12 to read or record data from/on the magnetic disk 12 which is rotating. In general, the transducer contacts the disk surface 18. This transducer is described as a single transducer, but it is understood that the transducer comprises a write transducer to magnetize the magnetic disk 12 and a read transducer, constituted from a magneto-resistive (MR) device, which is separated from the write transducer, to sense the magnetic field of the magnetic disk 12.

The transducer may be integrated into a head 20. The head 20 forms air flow that acts like a bearing between the transducer and the disk surface 18. The head 20 is positioned on a head stack assembly (HSA) 22 which is attached to an actuator arm 24 having a voice coil 26. The voice coil 26 is adjacent to a magnetic assembly 28 from a voice coil motor (VCM) 30. Current supplied to the voice coil 26 generates torque which rotates the actuator arm 24 with respect to a bearing assembly 32. The rotation of the actuator arm 24 moves the transducer across the disk surface 18.

Figure 2:
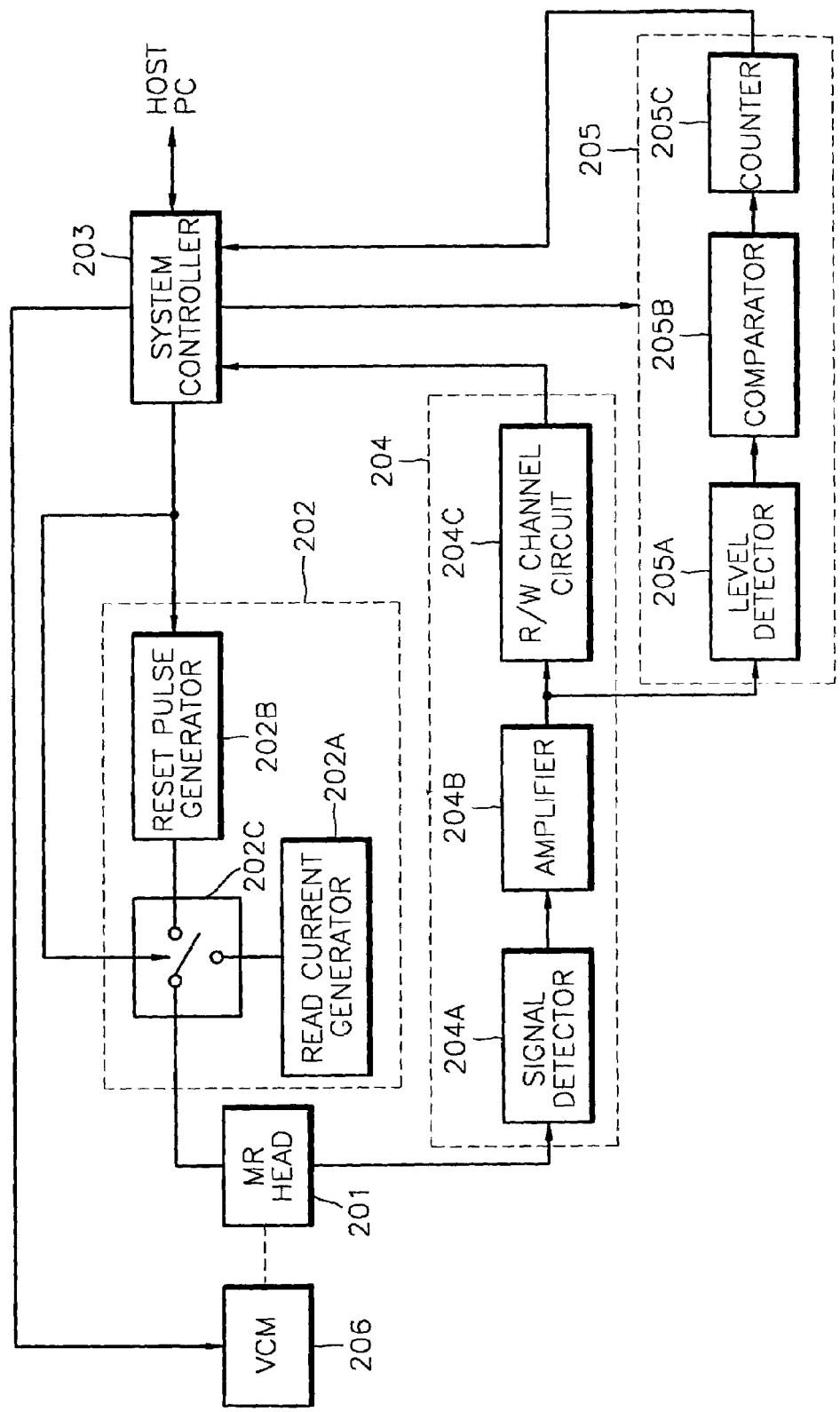
FIG. 2 is a block diagram of an apparatus to restore the stability of the head in a data storage system according to an embodiment of the present invention.

Information is generally stored in an annular track of the magnetic disk 12. As illustrated in FIG. 2, each track 34 generally includes a plurality of sectors. Each sector comprises a data sector having a data field and an identification field, and a servo sector. An inter sector gap (ISG) exists between data sectors. The identification field includes a gray code to identify a sector and a track. The transducer moves across the disk surface 18 to read or record information from/on another track.

FIG. 2 is a block diagram of a head stability restoring apparatus in a data storage system according to an embodiment of the present invention. As illustrated in FIG. 2, the restoring apparatus according to this embodiment includes an MR head 201, a head supply current controller 202, a system controller 203, a signal processor 204, a thermal asperity detector (TAD) 205, and a VCM motor 206.

The head supply current controller 202 includes a read current generator 202A, a reset pulse generator 202B, and a switch 202C. The signal processor 204 includes a signal detector 204A, an amplifier 204B, and an R/W channel circuit 204C. The thermal asperity detector 205 includes a level detector 205A, a comparator 205B, and a counter 205C.

The MR head 201, formed of an inductive ferromagnetic alloy such as NiFe, detects data written on the disk in a reading mode of a hard disk drive and is a sensor and transforms a magnetic resistance value in response to magnetic information written on the disk.

The read current generator 202A generates current which is supplied to the MR head 201 so that the hard disk drive senses changes in a resistance value of the MR head 201 using current (or voltage) in response to magnetic information recorded on the magnetic disk 12 in the reading mode of the hard disk drive.

The reset pulse generator 202B generates a bias shock current to arrange domains, in the same direction, which are unstable on an easy axis of the MR head 201.

The switch 202C switches and outputs current applied to the MR head 201 in correspondence to a current shock control signal applied from the system controller 203.

The signal detector 204A senses a resistance value which is transformed in the reading mode in response to a magnetic flux pattern of a signal written on the disk by the MR head 201 to detect the signal written on the disk. In other words, the signal detector 204A detects the signal written on the disk using a voltage result obtained by multiplying the read current by the transformed resistance value of the MR head 201 according to Ohm's law.

The amplifier 204B amplifies a signal output from the signal detector 204A so as to be suitable for processing a signal of the system.

The R/W channel circuit 204C converts an amplified analog signal read from the MR head 201 into a digital signal which can be read by a host computer (not shown) and receives user data from the host computer to perform a signal processing to convert the user data into a write current to be recorded on the disk.

Figure 5:
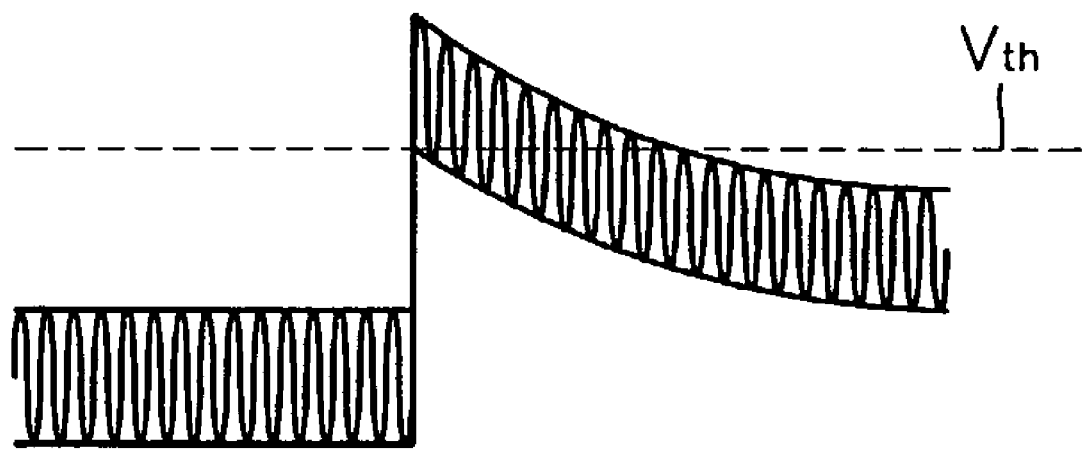
FIG. 5 is a waveform diagram of a voltage signal obtained if a thermal asperity is detected.

The level detector 205A detects a peak level of a signal output from the amplifier 204B. The comparator 205B compares the level of the signal output from the amplifier 204B with a reference voltage Vth to output a signal in logic "high" if the peak level is greater than the reference voltage Vth, and a signal in logic "low" otherwise. Here, the reference voltage Vth is set to a level suitable to detect baseline popping noises as shown in FIG. 5.

The counter 205C counts the number of pulses in logic "high" output from the comparator 205B to output the number to the system controller 203.

The thermal asperity detector 205 operates when a bit error rate (BER) exceeds a reference value due to the control of the system controller 203 or when a retry routine is turned on due to errors caused by the inspection of an error correction code (ECC). In particular, the thermal asperity detector 205 is designed so that a thermal asperity is detected only in a servo sector of a track.

A voice coil motor (VCM) moves the transducer using a seek routine from one track to another track in correspondence to the control of the system controller 203 and a following routine to find a target sector in a track.

The system controller 203 controls the hard disk drive and the communication of data with the host computer. Also, the system controller 203 controls the instability of a head in a data storage system of the present invention.

A head stability restoring method due to the instability of a head in a data storage system according to an embodiment of the present invention will now be described with reference to flowcharts illustrated in FIGS. 3 and 4 and the restoring apparatus illustrated in FIG. 2.

In an embodiment of the present invention, a performance inspection in relation to read data error caused by the instability of the MR head 201 uses a BER inspection that is performed in a manufacturing process of the data storage system and an ECC inspection that is performed in a user field. Here, the BER represents how many errors occur from predetermined data bits included in a signal read by the MR head 201.

Figure 3:
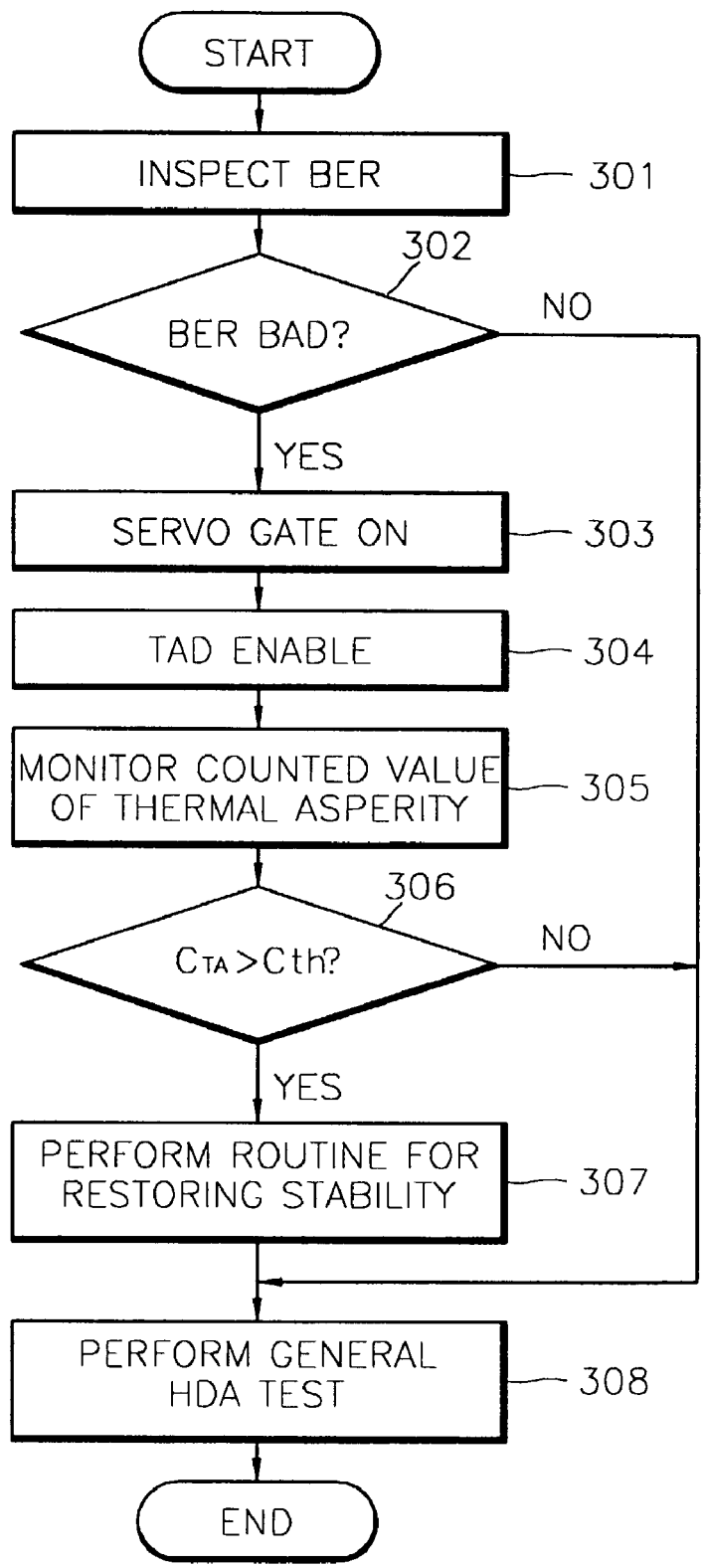
FIG. 3 is a flowchart of a method of restoring the stability of the head in a data storage system according to the embodiment of FIG. 2.
Figure 4:
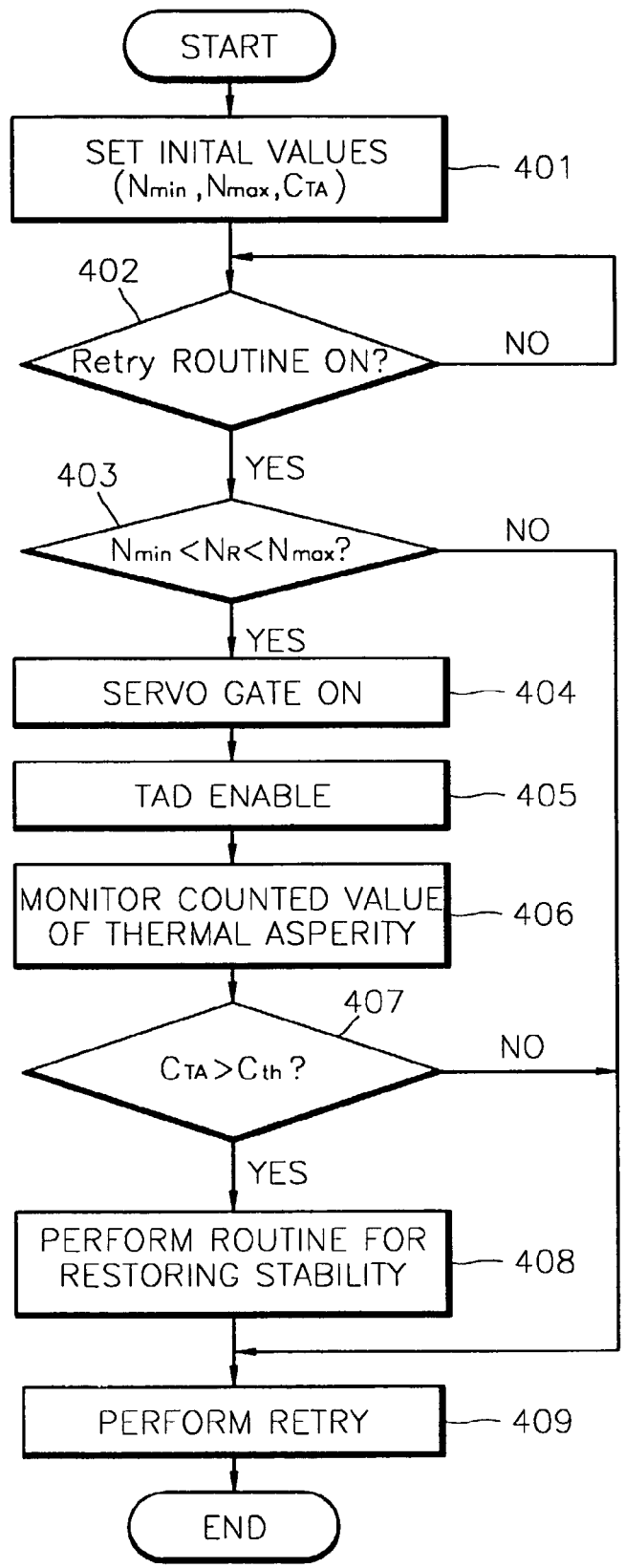
FIG. 4 is a flowchart of a method of restoring the stability of the head in a data storage system according to another embodiment of the present invention.

FIG. 3 is a flowchart of an embodiment of the inspection of BER which is applied as a performance check to determine the instability of an MR head while FIG. 4 is a flowchart of an embodiment of the inspection of errors using an ECC.

A head stability restoring method due to the instability of a head in a data storage system according to an embodiment of the present invention will first be described with reference to the flowchart illustrated in FIG. 3.

In operation 301, the system controller 203 checks the BER occurring in data reproduced in a burn-in process corresponding to a quality inspection of a manufacturing process. The system controller 203 determines whether the BER exceeds the reference value in operation 302. If the BER is larger than the reference value in operation 303, the system controller 203 turns on a servo gate to detect a thermal asperity due to baseline popping noises only in a servo sector of a track in operation 303. The system controller 203 generates a control signal to enable the TAD 205 in an initially set section in operation 304. For example, the initially set section may be set to one track of a specific address. Thus, the TAD 205 detects the baseline popping noises. In other words, the level detector 205A separates only reproduced signals in the servo sector from signals output from the amplifier 204B using servo gate signals and detects the peak level of the separated reproduced signals in the servo sector.

The comparator 205B compares the peak level detected in the level detector 205A with a reference voltage and generates pulses in a high level if the peak level is greater than the reference value. Here, the reference voltage is set to a level suitable to detect a thermal asperity due to the baseline popping noise as illustrated in FIG. 5.

The counter 205C counts pulses output from the comparator 205B and transmits the counted value to the system controller 203.

In operation 305, the system controller 203 monitors a counted value of the thermal asperity detected by the TAD 205. Then, in operation 306, the system controller 203 determines whether the counted value input from the counter 205C exceeds an admissible value of the thermal asperity. If the counted value exceeds the admissible value, the system controller 203 determines that baseline popping noise occurs due to the instability of the MR head and turns on a routine to restore the stability of the MR head. In other words, in this case, the system controller 203 applies a current shock control signal to the head supply current controller 202.

As a result, the head supply current controller 202 applies a bias current shock to the MR head 201 to restore the stability of the head in operation 307. In other words, the reset pulse generator 202B generates relatively high reset current pulses to rearrange an operation domain of the MR head 201 if the current shock control signal is applied to the reset pulse generator 202B. Here, the width, amplitude, and number of the reset current pulses vary depending on a resistance value of the MR head 201 and are determined to effectively arrange the operation domain of the MR head 201, using the statistic experimental data, without damaging the MR head 201. In particular, the amplitude of reset current is set to be inversely proportional to the resistance value of the MR head 201. The switch 202C switches to apply the reset pulses generated in the reset pulse generator 202B to the MR head 201 if the current shock control signal is applied to the switch 202C. Afterwards, a general hard disk assembly test is performed in operation 308.

However, if the counted value input from the counter 205C does not exceed the admissible value of the thermal asperity in operation 306, the quality problem is not due to the instability of the head. Thus, the stability of the head is reported and then a next general hard disk assembly test is performed.

In the above-described method, the instability of the MR head leads to poor quality in reproduced data. Also, if quality of reproduced data is poor, a thermal asperity is detected to accurately determine whether the poor quality is due to the instability of the head, and if this is true, the stability of the head is restored by a bias shock.

A head stability restoring method due to the instability of a head in a data storage system according to another embodiment of the present invention will be described with reference to the flowchart illustrated in FIG. 4.

In operation 401 of FIG. 4, a minimum value Nmin and a maximum value Nmax of the number of retries to determine whether a thermal asperity detection routine to determine the instability of a head is turned on are set on the condition that a retry for a sector is repeated several times due to errors caused by an ECC test. Also, in operation 401, a critical value $C_{TA}$ which sets a baseline popping noise to determine an admissible limit of the thermal asperity is determined. Here, it is effective to set the maximum value Nmax at least one unit higher than the maximum number of retries which is admitted by the system. This is to perform at least one more retry after the stability of the head is restored. Then, in operation 402, it is determined whether, due to errors caused by the ECC test in correcting errors of the data processing, a retry routine is turned on. If the retry routine is turned on in operation 402, in operation 403, it is determined whether the number of retries consecutively repeated in a sector is between the retry minimum value Nmin and maximum value Nmax set in operation 401.

In operation 404, if the current number of retries is between the minimum value Nmin and the maximum value Nmax in operation 403, the system controller 203 turns on a servo gate to detect a thermal asperity only in a servo sector while the MR head 201 re-follows a sector in which errors occur. This is to detect the thermal asperity in the entire servo sector of a track including the sector in which the errors occur while the sector having errors is followed by a retry routine.

The system controller 203 generates a control signal to enable the TAD 205 in operation 405. The TAD 205 detects a thermal asperity due to baseline popping noises by the same method as described in the embodiment of FIG. 3 and the system controller 203 monitors counted value of the detected thermal asperity in operation 406.

The system controller 203 determines whether the counted values exceed an admissible value of the thermal asperity in operation 407. The system controller 203 determines that the MR head is unstable and turns on a head stability restoration routine for the MR head 201 if the counted value exceeds the admissible value. In other words, in this case, the system controller 203 applies a current shock control signal to the head supply current controller 202.

In operation 408, the head supply current controller 202 applies a bias shock current to the MR head 201 by the operation described in the embodiment of FIG. 3 to restore the stability of the MR head 201.

However, if the counted value input from the counter 205C does not exceed the admissible value of the thermal asperity in operation 306, the quality problem is not due to the instability of the head. Thus, the stability of the head is reported and then a next general hard disk assembly test is performed.

As described above, according to an embodiment of the present invention, a thermal asperity detection (TAD) routine operates if the BER is large or an ECC error occurs in a process of manufacturing a data storage system or in a user field. Thus, it is determined whether the instability of a head causes a quality problem, and if it is determined that the instability of the head causes the quality problem, a bias shock current is automatically applied to the head to restore the stability of the head. It is accurately determined whether the head is unstable if the data quality problem occurs in the process of manufacturing the data storage system or in the user field to automatically restore the stability of the head. As a result, the quality of the data storage system is improved in the manufacturing process thereof and in the market.

The present invention can be executed as a method, an apparatus, or a system and the like. Elements of the present invention are code segments which execute necessary operations if the present invention is executed as software. Programs or code segments may be stored in a processor readable medium or may be transmitted by a computer data signal combined with a carrier wave in a transmission medium or communication network. The processor readable medium may include any medium which is capable of storing and transmitting information. The processor readable medium includes an electronic circuit, a semiconductor memory device, a ROM, a flash memory, an erasable ROM (EROM), a floppy disk, an optical disk, a hard disk, an optical fiber medium, a radio frequency (RF) net, and the like. The computer data signal includes any signal which may be transmitted over a transmission medium such as an electronic net channel, an optical fiber, air, electromagnetic field, an RF net, and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling the instability of a head in a data storage system by determining the instability of the head, the method comprising:
   monitoring a bit error rate of data reproduction to determine whether the bit error rate exceeds a reference value;
   detecting a thermal asperity in a predetermined section of a disk and counting the number of detected values of the thermal asperity if the bit error rate exceeds the reference value;
   determining whether the counted value of the thermal asperity exceeds an admissible value; and
   performing a process of restoring the stability of the head if the counted value of the thermal asperity exceeds the admissible value.

2. The method of claim 1, wherein the predetermined section to detect the thermal asperity is a servo sector of a specific track.

3. The method of claim 1, wherein the process of restoring the stability of the head reset comprises applying current pulses to the head.

4. A method of controlling the instability of a head in a data storage system by determining of the instability of the head, the method comprising:
   determining whether a retry routine is to be performed a predetermined number of times due to an error occurring when a reproducing mode is turned on;
   detecting a thermal asperity by performing a retry in a target sector in which an error occurs and counting the number of the detected values of the thermal asperity if the retry routine is turned on;
   determining whether the counted value of the thermal asperity exceeds an admissible value; and
   performing a process of restoring the stability of the head if the counted value of the thermal asperity exceeds the admissible value, otherwise, processing data in a retry process.

5. The method of claim 4, wherein the process of restoring the instability of the head reset comprises applying current pulses to the head.

6. An apparatus to control the instability of a head in a data storage system by determining the instability of the head, the apparatus comprising:
   a head to detect a signal written on a disk;
   a signal processor to process the signal detected by the head as data prior to being written in a reading mode and generating write current corresponding to data to be written in a writing mode;
   a controller to perform a predetermined performance inspection related to data errors using the data processed by the signal processor, generating a thermal asperity detection control signal if the performance inspection reveals data errors that exceed a predetermined limit, and generating a current shock control signal if the counted value of the thermal asperity exceeds an admissible value;

a thermal asperity detector to count the number of the thermal asperities due to a baseline popping noise detected in a predetermined section and outputting the number of the thermal asperities to the controller if the thermal asperity detection control signal is applied; and a head supply current controller to apply reset current pulses to the head if the current shock control signal is applied.

7. The apparatus of claim 6, wherein the predetermined performance inspection is a bit error rate inspection.

8. The apparatus of claim 6, wherein the predetermined performance inspection uses an error correction code inspection to determine whether an error occurs.

9. The apparatus of claim 6, wherein the head is formed of an inductive ferromagnetic alloy.

10. The apparatus of claim 6, wherein the head transforms a magnetic resistance value in response to magnetic information written on the disk.

11. The apparatus of claim 6, wherein the head supply current controller comprises:

a read current generator to generate current to be supplied to the head;

a reset pulse generator to generate a bias shock current to arrange domains in the same direction which are unstable on an easy axis of the head; and a switch to switch and output current supplied to the head in correspondence to the current shock control signal applied from the controller.

12. The apparatus of claim 6, wherein the thermal asperity detector comprises:

a level detector to detect a level of the processed signal input from the signal processor;

a comparator to compare the level detected in the level detector with a reference value and generating pulses if the detected level is greater than the reference value; and a counter to count the pulses output from the comparator.

13. The apparatus of claim 12, wherein the comparator generates a signal in logic high if the detected level is greater than the reference value, or otherwise, generates a signal in logic low.

14. The apparatus of claim 6, wherein the signal processor comprises:

a signal detector to sense a resistance value which is transformed in the reading mode in response to the magnetic flux pattern of a signal written on the disk to detect the signal written on the disk;

an amplifier to amplify a signal output from the signal detector to be suitable to process a signal of the system; and a R/W channel circuit to convert an amplified analog signal read from the head into a digital signal to be read by a host computer and to receive user data from the host computer to perform a signal processing to convert the user data into a write current to be recorded on the disk.

15. The apparatus of claim 14, wherein the controller controls the hard disk drive and communication of data with the host computer.

16. A computer readable medium controlling a computer to control the instability of a head in a data storage system by determining the instability of the head, and comprising a process of:

determining whether a retry routine is to be performed a predetermined number of times due to an error occurring when a reproducing mode is turned on;

detecting a thermal asperity by performing a retry in a target sector in which an error occurs and counting the number of the detected values of the thermal asperity if the retry routine is turned on;

determining whether the counted value of the thermal asperity exceeds an admissible value; and restoring the stability of the head if the counted value of the thermal asperity exceeds the admissible value, otherwise, processing data in a retry process.

17. The computer readable medium of claim 16, wherein the computer readable medium is an electronic device.

18. The computer readable medium of claim 16, wherein the computer readable medium is a semiconductor memory device.

19. The computer readable medium of claim 16, wherein the computer readable medium is an ROM.

20. The computer readable medium of claim 16, wherein the computer readable medium is a flash memory.

21. The computer readable medium of claim 16, wherein the computer readable medium is an erasable ROM (EROM).

22. The computer readable medium of claim 16, wherein the computer readable medium is a floppy disk.

23. The computer readable medium of claim 16, wherein the computer readable medium is an optical disk.

24. The computer readable medium of claim 16, wherein the computer readable medium is a hard disk.

25. The computer readable medium of claim 16, wherein the computer readable medium is an optical fiber medium.

26. A computer readable medium controlling a computer to control the instability of a head in a data storage system by determining the instability of the head, and comprising a process of:

monitoring a bit error rate of data reproduction to determine whether the bit error rate exceeds a reference value;

detecting a thermal asperity in a predetermined section of a disk and counting the number of detected values of the thermal asperity if the bit error rate exceeds the reference value;

determining whether the counted value of the thermal asperity exceeds an admissible value; and performing a process of restoring the stability of the head if the counted value of the thermal asperity exceeds the admissible value.

* * * * *